United States Patent
Pi et al.

(10) Patent No.: US 12,462,556 B2
(45) Date of Patent: Nov. 4, 2025

(54) RPC-BASED ON-ORBIT GEOMETRIC CALIBRATION METHOD FOR SPACEBORNE SEGMENTED LINEAR-ARRAY CAMERA

(71) Applicant: Wuhan University, Wuhan (CN)

(72) Inventors: Yingdong Pi, Wuhan (CN); Mi Wang, Wuhan (CN); Bo Yang, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 350 days.

(21) Appl. No.: 18/204,379

(22) Filed: May 31, 2023

(65) Prior Publication Data
US 2024/0020967 A1  Jan. 18, 2024

(30) Foreign Application Priority Data
Jul. 15, 2022 (CN) .......................... 202210837060.3

(51) Int. Cl.
*G06V 20/13* (2022.01)
*G06V 20/10* (2022.01)

(52) U.S. Cl.
CPC ............ *G06V 20/13* (2022.01); *G06V 20/194* (2022.01)

(58) Field of Classification Search
CPC .... G06V 20/13; G06V 10/147; G06V 10/243; G06T 7/85; G06T 2207/10032
See application file for complete search history.

(56) References Cited

PUBLICATIONS

Y. Pi, M. Wang, B. Yang and Z. Gao, "Robust Camera Distortion Calibration via Unified RPC Model for Optical Remote Sensing Satellites," in IEEE Transactions on Geoscience and Remote Sensing, vol. 60, pp. 1-15, 2022, doi: 10.1109/TGRS.2022.3198076. (Year: 2022).*

Y. Pi, X. Li and B. Yang, "Global Iterative Geometric Calibration of a Linear Optical Satellite Based on Sparse GCPs," in IEEE Transactions on Geoscience and Remote Sensing, vol. 58, No. 1, pp. 436-446, Jan. 2020, doi: 10.1109/TGRS.2019.2936891. (Year: 2020).*

* cited by examiner

*Primary Examiner* — Andrew M Moyer
*Assistant Examiner* — Conor A O'Malley
(74) *Attorney, Agent, or Firm* — JCIP GLOBAL INC.

(57) ABSTRACT

A robust on-orbit geometric calibration (GC) method based on the rational polynomial coefficient (RPC) model for spaceborne segmented linear-array camera is proposed. Through a series of processing steps, including obtaining reliable ground control point (GCP) observations based a priori gross error elimination, constructing the adjustment model for GC parameters, GC for absolute geometric distortion, GC for relative geometric distortions among segmented charge-coupled devices (CCDs), and the correction for the created bias field-of-view (FOV) distortion, this invention is able to achieve robust GC for camera distortion, as well as accurate geometric splicing and registration of segmented CCDs under the same geometric benchmark.

11 Claims, 12 Drawing Sheets

RPC-BASED ON-ORBIT GEOMETRIC CALIBRATION METHOD FOR SPACEBORNE SEGMENTED LINEAR-ARRAY CAMERA

CROSS-REFERENCE TO RELATED APPLICATIONS

Pursuant to 35 U.S.C. § 119 and the Paris Convention Treaty, this application claims foreign priority to Chinese Patent Application No. 202210837060.3 filed Jul. 15, 2022, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to the field of remote sensing image processing and analysis, and more particularly to a robust on-orbit geometric calibration (GC) method for spaceborne segmented linear-array camera based on a rational polynomial coefficient (RPC) model.

Correcting systematic distortion to improve geometric accuracy is key to fully utilizing optical satellite images. For a satellite-borne optical camera, geometric distortion occurs mainly as focal length error, optical distortion, and physical distortion from the imaging unit. It is challenging to use satellite images in high-precision applications, because these complex distortions exhibit high-order nonlinearity, and lead to that the images tend to suffer from nonlinear geometric deformation. Therefore, correcting camera distortion is an essential step in the geometric processing of satellite images. GC of imaging camera is an essential process and important technology to compensate for these systematic distortions in the geometric processing of an optical remote sensing satellite. Since geometric processing of optical satellite images begins with a rigorous physical model (RPM), GC estimates should be introduced into the RPM to compensate for the camera distortion. Thus, RPM-based on-orbit GC, which is the most commonly used method for optical satellites in active service, is almost always performed. However, although GC algorithms are based on simple spatial resection in the field of photogrammetry, each optical satellite is a complex measurement system integrating attitude, orbit, and time observations. Hence, RPM-based GC is complex and thus difficult to implement widely. The limitations of traditional methods arise from the following two aspects. RPM construction involves not only complex processing of auxiliary data, such as attitude, orbit, and time, but also the transformation of multiple coordinate systems from the satellite to the ground, which makes mathematical models for traditional GC extremely complex. Additionally, RPM construction is also closely related to satellite design, such that RPMs for satellites in different orbits or with different imaging cameras may be different, resulting in that the GC for different satellites cannot be unified under a standard model, which increases the complexity of, and level of expertise required for, GC processing.

To address such problems in the common RPM-based approaches, the disclosure provides a robust on-orbit GC method for spaceborne segmented linear-array camera based on the RPC model. This disclosure divided proposed RPC-based GC into the GC for absolute camera distortion and that for relative camera distortion. The former uses a stepwise method for obtaining an absolute GC that restored the interior orientation parameters (IOPs) from the exterior orientation parameter (EOPs) errors and the attitude-fitting errors, thus ensuring accurate and reliable GC estimations. The angular resolution is introduced into the adjustment equation for GC to address the issue of the distortion across the charge-coupled device (CCD), which cannot be overcome with a linear-array camera. Following this, the latter further uses angular resolution to integrate multiple CCDs into a unified EOP benchmark, and compensated for the distortion caused by the created bias field-of-view (FOV), allowing for accurate geometric splicing and registration. The achieved GC accuracy is consistent with that of traditional RPM-based methods. However, this method is based on a standardized RPC model, and precludes the need to construct a complex RPM, which is of great practical value and constitutes a considerable advantage over traditional methods.

SUMMARY

The disclosure provides a robust on-orbit GC method for spaceborne segmented linear-array camera based on an RPC model.

Provided is a method of on-orbit geometric calibration (GC) for a spaceborne segmented linear-array camera based on a rational polynomial coefficient (RPC) model, the method comprising:

using ground control point (GCP) identified from a reference image of a calibration site as observations, constructing a GC model based on current GC parameters and the RPC, detecting and eliminating gross GCPs using a global model error correction, and achieving the accurate solution through a stepwise absolute and relative GC assisted by angular resolution for the segmented linear-array camera.

The detailed implementation includes the following steps:

step 1: selecting a satellite remote sensing image for GC, according to an area where the reference image is located, and matching densely distributed corresponding image points as GCPs;

step 2: constructing a camera GC model suitable for a geometric processing of optical satellite images using a rigorous physical model (RPM) based on viewing-angle of charge-coupled device (CCD) detectors, and introducing multiple sets of polynomials to fit the viewing-angles of segmented linear-array CCDs, and then determining GC parameters to be solved;

step 3: before calculating the GC parameters, according to a correlation between interior orientation parameters (IOPs) and exterior orientation parameter (EOPs), correcting EOP and IOP errors in the RPC by introducing an integrated error correction model of the same order as a viewing-angle model into the RPC, thus reflecting the matching error of the GCPs, which are coupled with the EOP and IOP errors, calculating modified GCP residuals using the error correction model and taking a threshold defined as three times a root mean square error (3×RMSE) of the residuals, and detecting and eliminating the gross GCPs through the iterative estimation of the error correction model;

step 4: based on geometric characteristics of the camera EOPs, constructing an EOP error correction model for RPC with additional translation and rotation transformations, estimating and correcting the EOP errors in the RPC based on the GCPs, and then determining the virtual image points that reflects geometric errors of the IOPs;

step 5: taking the real and virtual image points of GCPs as the observations, taking a condition that the viewing-angles of the virtual and the real image point are equal as constraints, and then on this basis, constructing the adjustment model of the camera GC by introducing angular resolutions;

step 6: based on the constructed adjustment model, with assistances of angular resolutions along and across the CCD, performing the absolute GC of each CCD one by one using a stepwise optimization in these two directions along and across the CCD, and then compensating the absolute geometric distortion of each CCD;

step 7: selecting a CCD as the reference, performing the relative GC of the non-reference CCDs relative to the reference based on the angular resolutions and EOP corrections, and compensating relative position residuals of each non-reference CCDs relative to the reference CCD; and step 8: according to the corrected relative position residuals, based on an imaging inclination angle of the satellite-borne camera along satellite's orbit, constructing a compensation model for bias field-of-view (FOV) distortions, and fusing the compensation of this distortion of each CCD into the calculated viewing-angle model through an overall least squares adjustment, so as to correct the bias FOV distortion along the CCD caused by shifting the non-reference CCD along the orbit.

In a class of this embodiment, the reference image is a digital orthophoto map (DOM) and a digital elevation model (DEM).

In a class of this embodiment, all segmented CCD images match densely distributed corresponding image points in the same segment along an image line direction as GCP observations.

In a class of this embodiment, step 3 comprises:
firstly, based on object coordinates of the GCPs, calculating the corresponding image coordinates using the RPCs of the CCD images, and then obtaining the imagery positioning residuals between the calculated and the matched image coordinates;

secondly, using the error correction model of the same order as the viewing-angle model to correct the EOP and IOP errors existing in the imagery positioning residuals;

according to the correlation between EOPs and IOPs, using a least squares adjustment to calculate coefficients of the error correction model together, and then calculating remaining imagery residuals after correcting the EOP and IOP errors, which directly reflects matching errors of the GCPs; and counting a mean value and a root mean square error of all residuals to detect and eliminate the gross GCPs; and finally, after each detection and elimination, performing above estimating error correction model coefficients, detecting and eliminating gross GCPs again based on remaining GCPs; the gross error elimination is completed until the calculated coefficients in two consecutive iterations change less than the set threshold.

In a class of this embodiment, the angular resolution is determined according to an equivalent relationship between a ratio of angular resolutions and a ratio of ground sample distances in both directions; the ground sample distance ratio is obtained based on the local ground sample distances in the RPC model, and the angular resolution along the CCD is estimated using the calculated GC parameters in this direction.

In a class of this embodiment, the IOPs in both directions of each CCD is solved separately and in order; the IOPs for the along-CCD direction needs to be solved first; then, the angular resolution is determined according to calculated GC parameters for this direction, such that angular resolution for another direction can be obtained; GC parameters for the across-CCD direction are solved using the same least squares adjustment method as for the along-CCD direction.

In a class of this embodiment, a CCD is selected as the reference CCD, and the relative position distortions among the CCDs are corrected by modifying constant items in IOP for each non-reference CCD relative to the reference CCD.

In a class of this embodiment, an overall least squares adjustment is performed for each non-reference CCD to fuse the FOV distortion correction into final accurate GC parameters; therefore, the distortions caused by created basis FOV are optimized, and an accurate splicing and registration of all CCD images under a unified EOP benchmark can be realized.

A GC system for a spaceborne segmented linear-array camera based on an RPC model executing the method, comprises: a processor, a memory and a readable storage medium.

In a class of this embodiment, the memory stores program instructions; when the processor executes the instructions in the memory, the system performs the GC method of spaceborne segmented linear-array camera based on an RPC as the above-mentioned described.

In a class of this embodiment, the readable storage medium stores the computer program, and when the computer program is executed, the GC method of spaceborne segmented linear-array camera based on an RPC model as the above-mentioned described.

In a class of this embodiment, when the processor's execution comprising:
module 1: selecting the satellite remote sensing image for GC, according to the area where the reference digital orthophoto map (DOM) and digital elevation model (DEM) images are located, and matching densely distributed corresponding image points as GCPs;

module 2: constructing the camera GC model suitable for the geometric processing using RPM based on the viewing-angle, and introducing multiple sets of polynomials to fit the viewing-angles of segmented linear-array CCDs, and then determining the GC parameters to be solved;

module 3: correcting the model error of the RPC by introducing an error correction model of the same order as the viewing-angle model into the RPC, according to the correlation between the EOPs and IOPs, before calculating the GC parameters, thus reflecting the matching error of the GCPs, which are coupled with the EOP and IOP errors, and detecting and eliminating the gross GCPs through the iterative estimation of the error correction model;

module 4: constructing the EOP error correction model for RPC with additional translation and rotation transformations, based on the geometric characteristics of the camera EOPs, and estimating and correcting the EOP errors in the RPC use the GCPs, and then determining the virtual image points that reflect geometric errors of the IOPs;

module 5: taking the real and virtual image points of GCPs as the observations, taking the condition that the viewing-angles of the virtual and the real image point are equal as constraints, and then on this basis, constructing the adjustment model of the camera GC by introducing angular resolution;

module 6: performing the absolute GC of each CCD one by one using a stepwise optimization, with the assistance of angular resolutions along and across the CCD, and compensating for the absolute geometric distortion of each CCD;

module 7: selecting a CCD as the reference, performing the relative GC of the non-reference CCDs relative to the reference based on the estimated angular resolution and EOP corrections, and compensating the relative position residuals of each non-reference CCDs relative to the reference CCD;

module 8: constructing the compensation model for the bias FOV distortions, according to the corrected relative position residuals and the imaging inclination angle of the satellite-borne camera along the satellite orbit, and fusing the compensation of this distortion of each CCD into the calculated viewing-angle model parameters through the overall least squares adjustment, so as to correct the bias FOV distortion along the CCD caused by shifting the non-reference CCD across the CCD.

Compared with the existing technology, the disclosure has the following beneficial effects. First, the disclosure standardizes the important GC technology in geometric processing to a unified RPC model, so as to overcome the limitations of traditional methods due to the complexity and diversity of RPMs. Second, the disclosure establishes a systematic RPC-based GC method from gross error elimination, absolute distortion calibration and relative distortion calibration, which solves the problems of error coupling, non-uniform EOP benchmark and bias FOV distortion. Finally, the parameter form and accuracy obtained by the method are almost consistent with that from RPM-based method. The obtained result can be directly used to compensate the camera distortion in the RPM, which fits in with the geometric processing link of optical satellite images.

DETAILED DESCRIPTION

Figure 1:
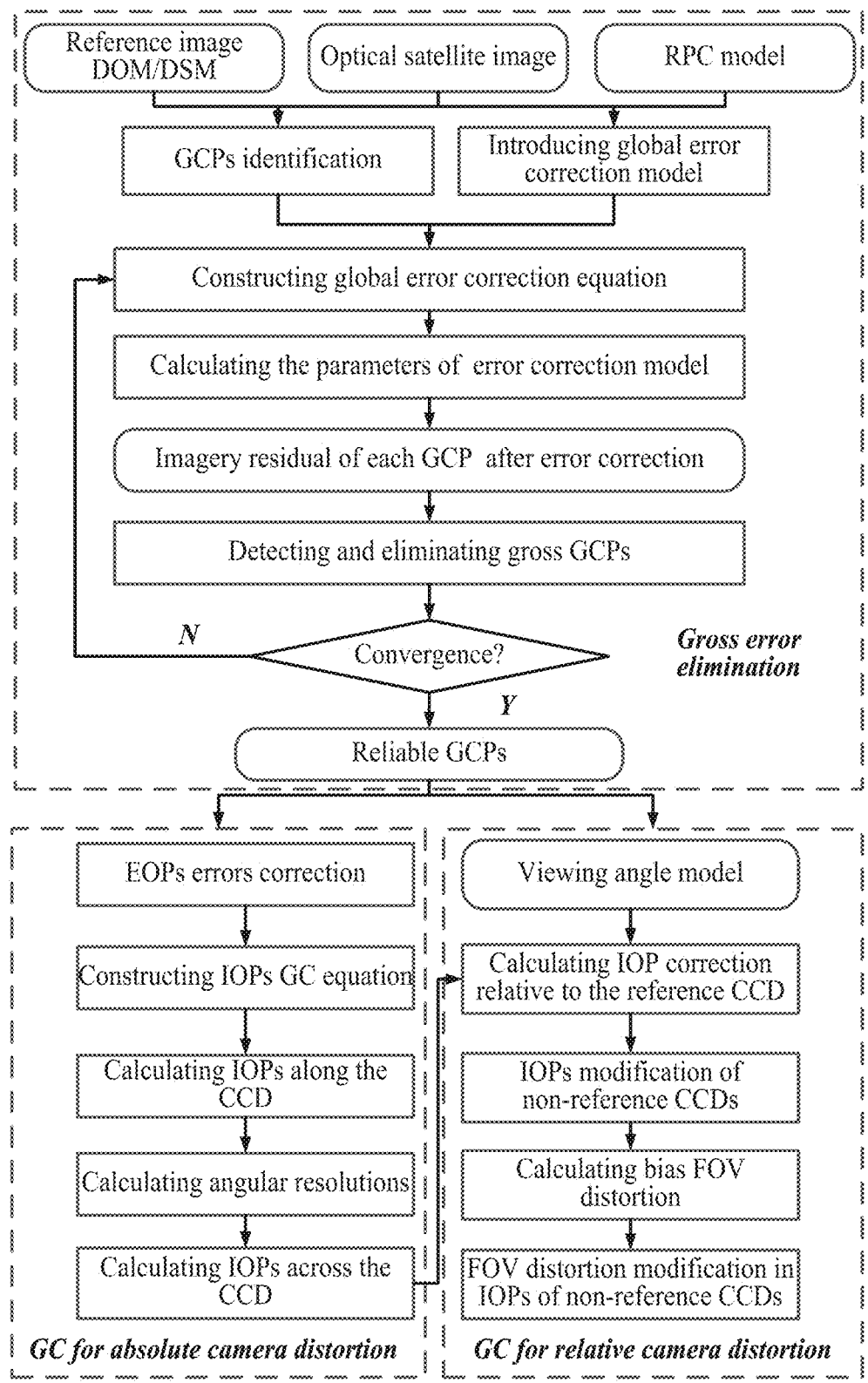
FIG. 1 is a flowchart that illustrates the method of robust on-orbit GC method for spaceborne segmented linear-array camera based on the RPC model.

FIG. 1 is a flowchart that illustrates the method of robust on-orbit geometric calibration (GC) method for spaceborne segmented linear-array camera based on the rational polynomial coefficient (RPC) model. A further detailed description of the method is given below for each step in the embodiments.

Step 1. Select satellite remote sensing images for GC, according to where the reference DOM and DEM are located, and match densely distributed corresponding image points as GCP observations;

According to the location of the reference DOM and DEM, the cloudless segmented images collected by the spaceborne linear-array camera are selected as the GC images. Dense corresponding image points are identified from the GC images and reference DOM and DEM as the GCP observations. In order to overcome the influence of time-varying attitude and orbit errors, it is necessary to match points in the same small segment (about 1000 lines) in image line direction.

Step 2. Construct the imaging model of optical satellite images using corresponding rational polynomial coefficients, and construct the camera GC model based on the viewing-angle of CCD detectors.

This step further includes the following sub-steps:

Step 2.1. Since the RPM-based GC cannot be performed without the support of attitude, orbit, imaging time and the design of camera, which determines the limitations of this method in practical applications. As an alternate of RPM, the generalized RPC model was developed for convenient and efficient usage of optical satellite images. The RPC model represents the least squares fit of the RPM, and has almost the same accuracy as RPM. As shown in equation (1), this model directly establishes the corresponding relationship between imagery and object space through unified RPCs.

$$\begin{cases} x = \dfrac{Num_L(U, V, W)}{Den_L(U, V, W)} = \dfrac{\sum_{i=0}^{3}\sum_{j=0}^{i}\sum_{k=0}^{j} p_{1ijk} U^{i-j} V^{j-k} W^k}{\sum_{i=0}^{3}\sum_{j=0}^{i}\sum_{k=0}^{j} p_{2ijk} U^{i-j} V^{j-k} W^k} \\ y = \dfrac{Num_S(U, V, W)}{Den_S(U, V, W)} = \dfrac{\sum_{i=0}^{3}\sum_{j=0}^{i}\sum_{k=0}^{j} p_{3ijk} U^{i-j} V^{j-k} W^k}{\sum_{i=0}^{3}\sum_{j=0}^{i}\sum_{k=0}^{j} p_{4ijk} U^{i-j} V^{j-k} W^k} \end{cases} \quad (1)$$

where, (U, V, W) is the intermediate normalized parameter of ground coordinates (Lon, Lat, Hel), and (x, y) is the intermediate normalized parameter of image coordinates (s, l), respectively. $p_{1ijk}$, $p_{2ijk}$, $p_{3ijk}$, $p_{4ijk}$ (i=0, 1, 2, 3) (j=0, 1, 2, 3) (k=0, 1, 2, 3) is the RPC parameters.

Figure 2:
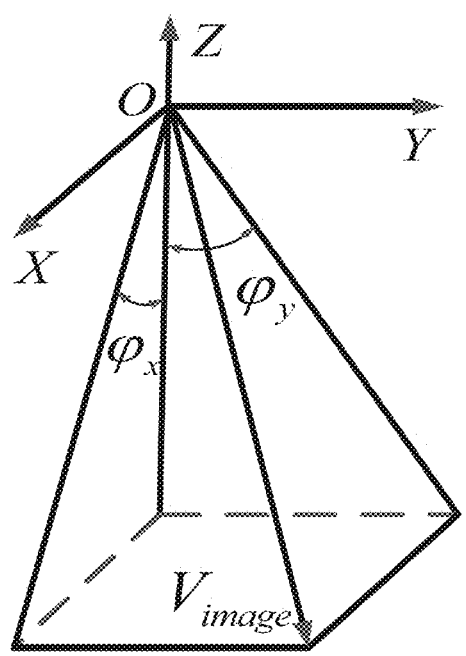
FIG. 2 is the schematic diagram showing the viewing-angles of the CCD detector in the camera coordinate system.

FIG. 2 is the schematic diagram showing the viewing-angles of the CCD detector in the camera coordinate system. As estimated GC parameters are applied directly to build an RPM for subsequent geometric processing, the adopted GC model should be the same as that used in traditional RPM-based GC. According to the imaging mechanism of an optical camera, physical camera models can be constructed and used as the GC model for satellite camera. However, due to the geometric characteristics of an optical satellite, there may be strong correlations between some parameters in its physical camera model that can cause instability of GC. To overcome parameter coupling, generalized viewing-angle models can be adopted for practical application; in these models, the position of each image detector can be determined based on viewing-angles ($\varphi_x$, $\varphi_y$) derived from the camera coordinate system O—XYZ.

Step 2.2. Two polynomials are used to fit the viewing-angles in both directions. $(v_x, v_y)$ is used to represent the angle tangents (tan $\varphi_x$, tan $\varphi_y$), then viewing-angle fitting models for linear-array camera are obtained:

$$\begin{cases} v_x(s, gc) = a_0 + a_1 s + a_2 s^2 + a_3 s^3 \\ v_y(s, gc) = b_0 + b_1 s + b_2 s^2 + b_3 s^3 \end{cases} \quad (2)$$

where s is the detector number of a linear CCD and gc=$(a_i, b_i)$ (i=0, 1, ... 3) includes coefficients of the viewing-angle model and GC parameters.

Step 3. Perform detecting and eliminating the gross GCP observations using global model error correction. Because dense GCPs used for GC are usually automatically identified from reference images via image matching, matching error is inevitable with a large number of GCP observations, which can greatly reduce the accuracy and reliability of GC. Therefore, it is necessary to eliminate gross GCPs that give rise to obvious matching error. In traditional RPM-based GC, gross GCPs can be detected by estimating the geo-positioning residuals of GCPs while performing GC. However, for RPC-based GC, a new imaging model cannot be reconstructed during the GC solution. As a result, geo-positioning residuals corresponding to estimated GC parameters cannot be determined, causing the model errors of IOPs and EOPs in the RPC to be entangled with the gross GCPs, thus making it difficult to effectively distinguish gross observations in GC.

According to the correlation between IOPs and EOPs, EOP error can also be compensated for by IOPs. Thus, a priori gross observation elimination method using global error correction is proposed. First, an error correction model of the same order as the GC model is used to optimize the geo-positioning residuals for all GCPs, as determined by the initial RPC model. This correction model corrects IOP and EOP errors in the imagery residuals, to reveal matching error due to the GCPs. The modified image residual $(v_s, v_l)$ is described as follows:

$$\begin{cases} v_s = ds - \Delta s \\ v_l = dl - \Delta l \end{cases} \quad (3)$$

$$\begin{cases} \Delta s = ca_0 + ca_1 s + ca_2 s^2 + ca_3 s^3 \\ \Delta l = cb_0 + cb_1 s + cb_2 s^2 + cb_3 s^3 \end{cases} \quad (4)$$

where (ds, dl) is the initial GCP positioning residual calculated by the RPC model, $(\Delta s, \Delta l)$ is the error correction model, and $(ca_i, cb_i)$ (i=0, 1, ... 2) are the correction model coefficients to be estimated.

Then, taking the sum of squares of all GCP residuals $(v_s^T v_s + v_l^T v_l)$ as the minimum constraint, the error model coefficients are iteratively solved using least-squares adjustment. Therefore, modified imagery residuals can be obtained according to equation (3) with iterative solving, directly reflecting matching error related to the GCPs. After each iterative solution, the mean value (mean$_{vs}$, mean$_{vl}$) and root mean square error (RMSE) (rmse$_{vs}$, rmse$_{vl}$) for all imagery residuals in both directions are estimated. Three times the RMSE value is commonly used as the threshold for error processing, and any GCP with a residual greater than this threshold will be directly eliminated as a gross GCP. The gross error elimination condition is as follows:

$$(|v_s - \text{mean}_{vs}| > 3 \cdot \text{rmse}_{vs}) \| (|v_l - \text{mean}_{vl}| > 3 \cdot \text{rmse}_{vl}) \quad (5)$$

In the iterative solution, gross errors are continuously eliminated until the estimated model coefficients stabilize. This gross error elimination can not only effectively eliminate mismatched GCPs, but also ensures that subsequent steps to solve for IOPs and EOPs are performed under the same ground constraints, so as to avoid adverse impacts from residual EOP errors (caused by the correlation between IOPs and EOPs) and thus improve GC accuracy.

Step 4. Stepwise estimation of the camera calibration parameters for compensating for the absolute geometric distortion of each CCD.

This step further includes the following sub-steps:

Step 4.1. Separating IOP errors from EOP and attitude-fitting errors coupled in the initial RPC model is key for camera GC. For an optical satellite, the EOP errors mainly cause translation and rotation error in a single image, but will not result in other high-order distortions. Therefore, the geo-positioning residual related to camera distortion can be obtained by directly correcting the translation and rotation errors in the initial positioning residual. The following EOP error correction model can then be obtained:

$$\begin{bmatrix} v_{es} \\ v_{el} \end{bmatrix} = \begin{bmatrix} s_0 \\ l_0 \end{bmatrix} + \begin{bmatrix} \cos\theta & -\sin\theta \\ \sin\theta & \cos\theta \end{bmatrix} \begin{bmatrix} s+ds \\ l+dl \end{bmatrix} - \begin{bmatrix} s \\ l \end{bmatrix} \quad (6)$$

where $(v_{es}, v_{el})$ represent the modified image positioning residual after EOP error correction, $(s_0, l_0)$ represent the corrected translation error, $\theta$ is the rotation angle, (s, l) are the image coordinates of the GCP, and (ds, dl) represent the initial image positioning residual of a GCP calculated by the RPC model.

Then, with reliable GCPs after gross error elimination, and taking the sum of squares of all GCP residuals $(v_{es}^T v_{es} + v_{el}^T v_{el})$ as the minimum constraint, EOP error correction parameters are iteratively solved for least-squares adjustment. The virtual image point coordinates are further obtained as $s'=s+v_{es}$ and $l'=l+v_{el}$.

Figure 3:
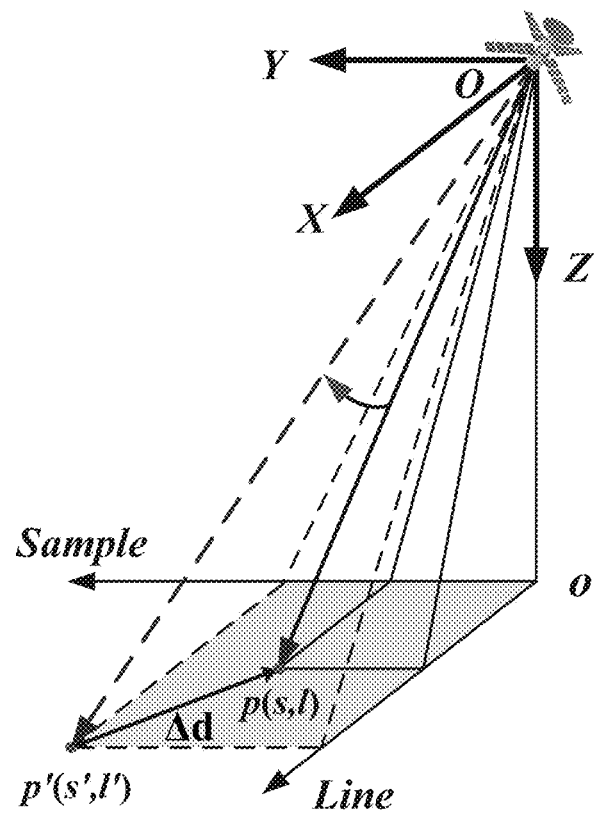
FIG. 3 is the schematic diagram showing the principle of performing the distortion calibration of a satellite camera based on the RPC.

FIG. 3 is the schematic diagram showing the principle of performing the distortion calibration of a satellite camera based on the RPC. For each ground point P, the corresponding real image point is p with image coordinates of (s, l). Due to geometric distortion in the imaging model, the virtual image point projected by the current RPC model is p' with image coordinates of (s', l'). Therefore, the image residual $\Delta$d between these two image points is the geo-positioning residual arising from systematic geometric distortion. To achieve GC, a new set of GC parameters must be calculated to eliminate geo-positioning residuals from a whole-scene image. To eliminate the image residual $\Delta$d, it is necessary that the line of sight at real image point (s, l) is the same as that at virtual image point (s', l'). Then, according to the viewing-angle model in equation (2), the following mathematical model can be obtained:

$$\begin{cases} v_x(s, gc_{est}) = v_x(s', gc_{ori}) \\ v_y(s, gc_{est}) = v_y(s', gc_{ori}) \end{cases} \quad (7)$$

in which, $gc_{on}$ is original GC parameters, and $gc_{est}$ is GC parameters to be estimated.

Step 4.2. With the real image point (s, l) and virtual image point (s', l') for each GCP used as observations, the IOPs that can compensate for the absolute geometric distortion of each CCD can be estimated. For a linear-array camera, GC adjustment equation along each CCD can also be established directly according to equation (7). However, in equation (2), the GC model for imaging across CCD does not include the image line number, so GC parameters directly solved for using equation (7) cannot compensate for distortion in this direction. To resolve this issue, based on the stability of the local angular resolution across CCDs, this method introduces angular resolution across CCDs into the adjustment equation to accurately compensate for distortion in this direction, as follows:

$$\begin{cases} G_x = v_x^{ori}(s', gc_{ori}) - v_x^{est}(s, gc_{est}) \\ G_y = v_y^{ori}(s', g_{ori}) - v_y^{est}(s, gc_{est}) + \tan(v_{el}v_{ar\_l}) \end{cases} \quad (8)$$

where $gc_{ori}=(oa_i, ob_i)$ and $gc_{est}=(na_i, nb_i)$ (i=0, 1, ... 2) are the original GC and GC parameters to be estimated, respectively, $(v_x^{ori}, v_y^{ori})$ and $(v_x^{est}, v_y^{est})$ are the respective viewing-angle fitting models determined according to equation (4), and $v_{or\_l}$ is the local angular resolution.

There is an equivalent relationship between the ratio of angular resolution and ratio of ground sample distance in both directions, i.e., $v_{or\_l}/v_{or\_s}=v_{gsd\_l}/v_{gsd\_s}$, in which the ground sample distance ratio $v_{gsd\_l}/v_{gsd\_s}$ is obtained based on the local ground sample distances (in the area where the GCPs are located) in the RPC model, and the angular resolution along the CCD v is estimated using the GC parameters calculated in this direction. Therefore, to perform GC, the two adjustment equations in equation (8) should be solved separately, and the adjustment equation for the along-CCD direction needs to be solved first. For the adjustment equation constructed for the jth pair of virtual and real image point, the error equation used for parameter solving is constructed through model linearization, as follows:

$$v_x^j = A_j x_{iop} - L_j P_j \quad (9)$$

where $x_{iop}$ represents the corrected GC parameters, $$A_j = \begin{bmatrix} \frac{\partial G_x}{\partial na_0} & \cdots & \frac{\partial G_x}{\partial na_3} & \frac{\partial G_x}{\partial nb_0} & \cdots & \frac{\partial G_x}{\partial nb_3} \end{bmatrix}_j$$

is the partial derivative matrix of IOPs, $L_j$ is the residual vector calculated using the current and original IOPs, and $P_j$ is the weighted matrix.

According to least-squares theory, $x_{iop}$ can be estimated as follows:

$$x_{iop} = \left(\sum_{j=1}^{n} A_j^T P_j A_j\right)^{-1} \left(\sum_{j=1}^{n} A_j^T P_j L_j\right) \quad (10)$$

where n is the number of GCPs. Least-squares estimation is an iterative process. IOPs are updated based on the estimated correction $x_{iop}$, and the updated IOPs are used as inputs in the next iteration. The calculations continue until the difference between two successive results is less than a predefined tolerance threshold.

Then, the angular resolution $v_{or\_s}$ is determined according to calculated GC parameters for this direction, such that another angular resolution $v_{or\_l}$ can be obtained. Furthermore, based on another equation in equation (8), GC parameters for the across-CCD direction are solved using the same least-squares method as for the along-CCD direction.

Step 5. Further optimize camera calibration parameters using stepwise estimation for compensating for the relative geometric distortion among CCDs.

Figure 4:
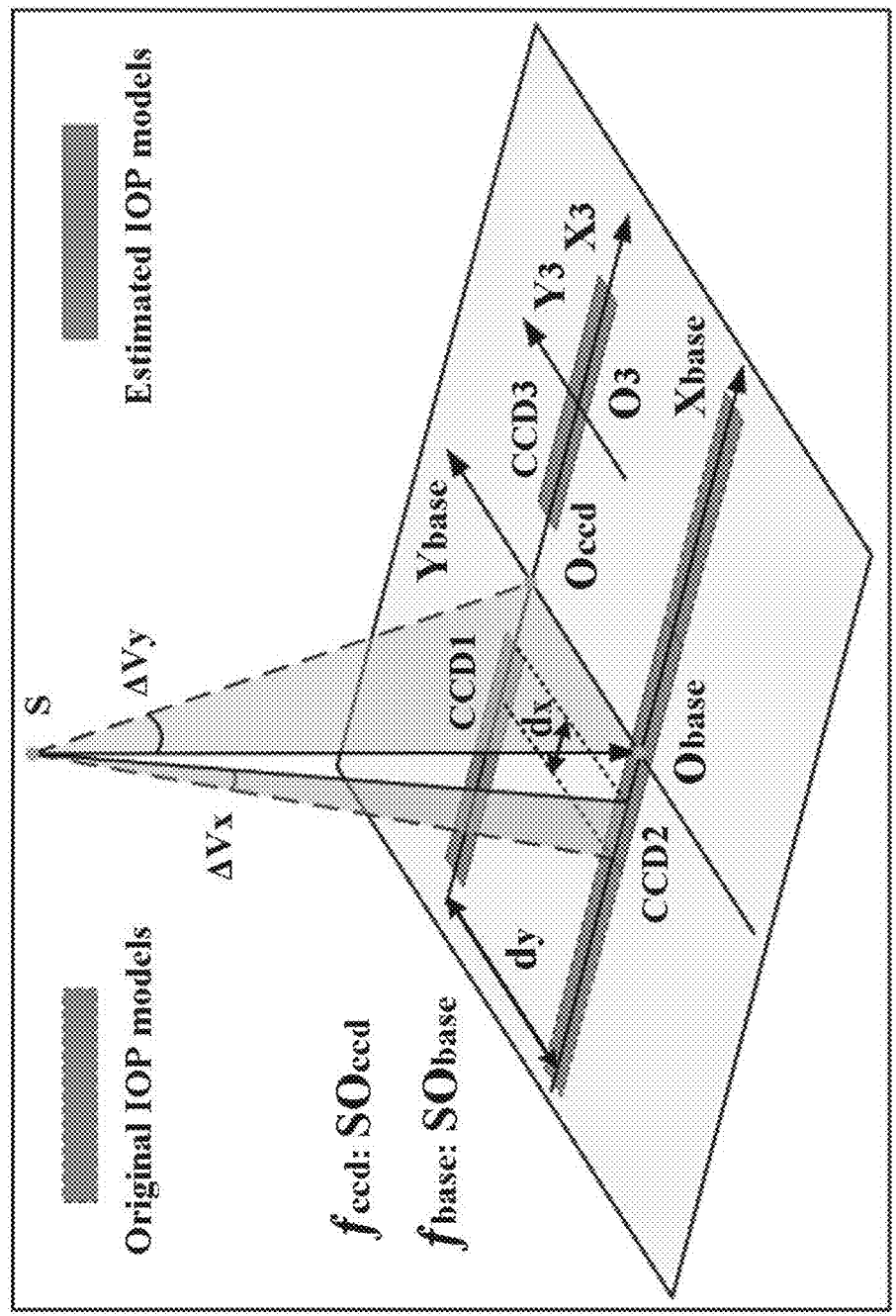
FIG. 4 is the schematic diagram showing the correction of the relative geometric position distortions among multiple CCDs.

This step further includes the following sub-steps:

FIG. 4 is the schematic diagram showing the correction of the relative geometric position distortions among multiple CCDs. Although the above approach compensates for the geometric distortion attributed to each CCD, accurate splicing and registration of all CCD images under the same EOP reference cannot be achieved. FIG. 4 assumes that an optical camera contains three CCDs, and that one of them is selected as the reference (CCD2). In this camera, above absolute GC of each CCD is performed based on their respective EOP modification. Therefore, the relative errors in the original IOPs of CCDs to ensure the geometric splicing and registration among CCD images under the same EOPs is eliminated by their respective EOPs, which is equivalent to that the IOPs GC of each CCD is carried out in their respective focal plane coordinate system actually (such as the $O_3$-$X_3Y_3$ of CCD3), rather than a unified coordinate system. As a result, there is a relative position distortion (dx, dy) between each calibrated and the reference CCDs.

Step 5.1. To address this issue, geometric splicing and registration of all CCD images is achieved by restoring the relative angle residual ($\Delta v_x$, $\Delta v_y$) between IOP models of reference and non-reference CCDs under a unified EOP datum, determined based on the reference CCD. The angular resolution is used again to restore the relative angle residual ($\Delta v_x$, $\Delta_y$), with assistance from the relative position residual between CCDs. The relative position residuals are determined in EOP error correction, and the angular resolutions are estimated in IOP calculation. It should be noted that the angular resolution across CCDs is basically the same for all CCDs. However, due to their different positions, the angular resolution across the CCD needs to be estimated separately based on its own GC parameters. Therefore, IOP correction of the kth non-reference CCD relative to the reference CCD can be obtained as follows:

$$\begin{cases} \Delta v_x^k = \tan(s_0^k, v_{or\_s}^k - s_0^{base} \cdot v_{or\_s}^{base}) \\ \Delta v_y^k = \tan(l_0^k, v_{or\_l}^k - l_0^{base} \cdot v_{or\_l}) \end{cases} \quad (11)$$

where $(s_0^k, l_0^k)$ and $(s_0^{base}, l_0^{base})$ represent the estimated EOP translation error correction of non-reference and reference CCDs, respectively, v is the angular resolution across CCDs, and $v_{or\_s}^k$ $v_{or\_s}^{base}$ are the angular resolutions along non-reference and reference CCDs, respectively.

Then, by modifying the constant IOPs ($na_0$, $nb_0$) for each non-reference CCD using its correction factor ($\Delta v_x^k$, $\Delta v_y^k$), the relative position residual (dx, dy) between each calibrated CCD and the reference CCD corrected.

Figure 5:
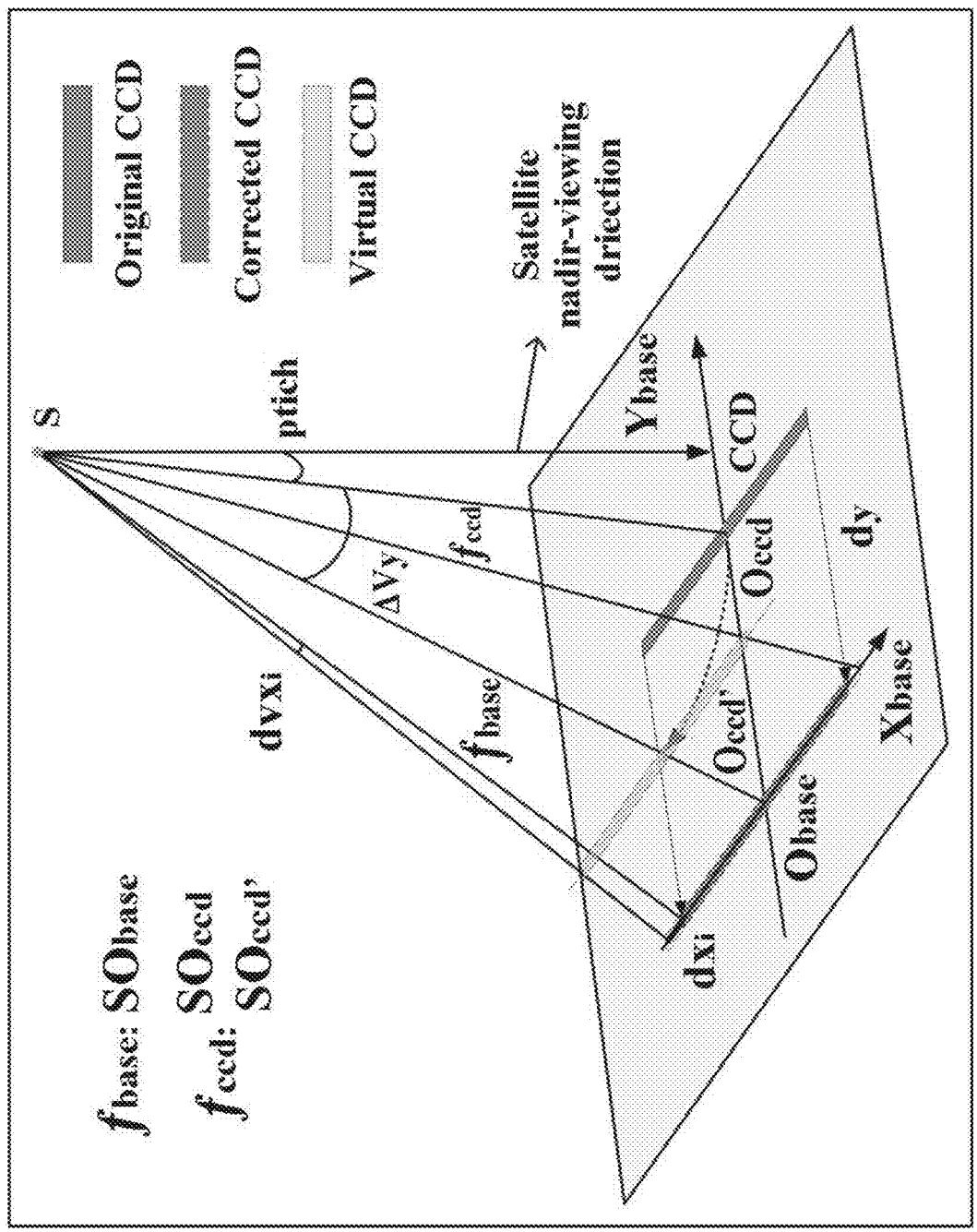
FIG. 5 is the schematic diagram showing the correction of the geometric distortion caused by created bias FOV imaging.

FIG. 5 is the schematic diagram showing the correction of the geometric distortion caused by created bias FOV imaging. While correcting the relative position distortion among CCDs, a distortion is resulted from the created bias FOV. For a non-reference CCD, after correcting the relative translation residual dy across the CCD, its imaging focal length is changed from $f_{cad}$ to $f_{base}$, and then a bias FOV imaging is created. This created bias FOV will introduce new distortion along the CCD, which will deduce the relative geometric accuracy among images.

Step 5.2: To compensate for this distortion, this method first calculates the bias FOV distortions of all CCD detectors according to the imaging geometry, and then uses the least squares fitting to fuse their corrections into the estimated GC parameters. A virtual CCD on the imaging direction $SO_{base}$ of the CCD after correcting relative translation distortion is set. The focal length of the virtual CCD is the same as that of the original CCD. Therefore, the difference between the projection of the virtual CCD on the focal plane and the corrected CCD is the distortion caused by created bias FOV, as the dx, and its corresponding angular distortion dvx. According to the geometric relationship, the distortion of ith detector for the kth non-reference CCD can be obtained as follows:

$$dvx_i^k = dx_i^k \cdot v_{or\_s}^k = x_i^k \cdot v_{or\_s}^k \cdot \left( \frac{\cos(\text{pitch})}{\cos(\text{pitch} + (l_0^k - l_0^{base}) \cdot v_{or\_l})} - 1 \right) \quad (12)$$

where $x_i^k$ represents the position of this detector relative to the center of the reference CCD in the direction along the CCD, and pitch is the imaging inclination of the satellite-borne camera along the satellite orbit.

Then, for the kth non-reference CCD, we can establish the relationship between the currently estimated GC parameters $gc_{est}^k$ and the final accurate GC parameters $gc_{new}^k$:

$$v_x^{new}(i, gc_{new}^k) = v_x^{est}(i, gc_{est}^k) - \tan(dvx_i^k) \quad (13)$$

where $gc_{est}^k$ and $gc_{new}^k$ are the current estimated GC parameters and the new GC parameters to be estimated for the kth non-reference CCD, respectively, $v_x^{est}$ and $v_x^{new}$ are the respective viewing-angle fitting models determined according to equation (2).

For each non-reference CCD, a set of observation equations are obtained by establishing the equation (13) of all detectors, and the final GC parameters are solved by the least squares estimation. Therefore, the distortions caused by created basis FOV are optimized in the GC parameters, and the accurate splicing and registration of all CCD images under the unified EOP benchmark can be realized.

Example 1

For better explaining the patent, a set of multispectral images (12 segmented CCD images) of ZiYuan-3 02 satellites is used to present the workflow. The satellite is equipped with a linear multispectral camera, capable of recording images in four spectral bands: blue (B1), green (B2), red (B3), and infrared (B4).

Figure 6:
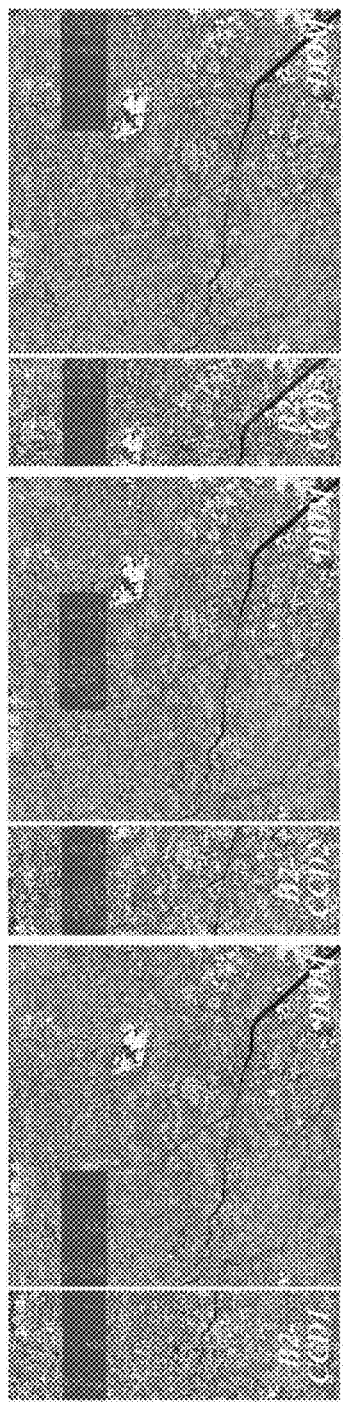
FIG. 6 is the distribution diagram of the matched GCPs from satellite images.
Figure 7A:
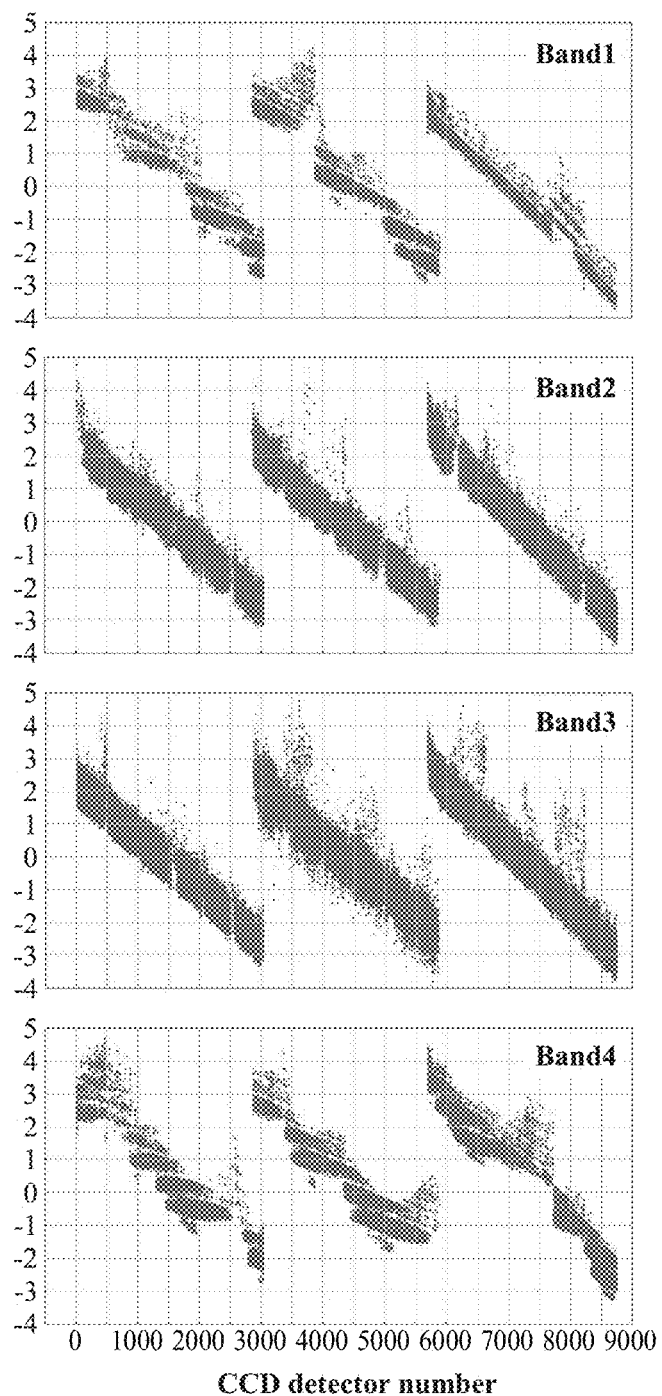
FIGS. 7A-7D are the distribution diagrams of geo-positioning residual of all CCDs before and after GC.
Figure 7B:
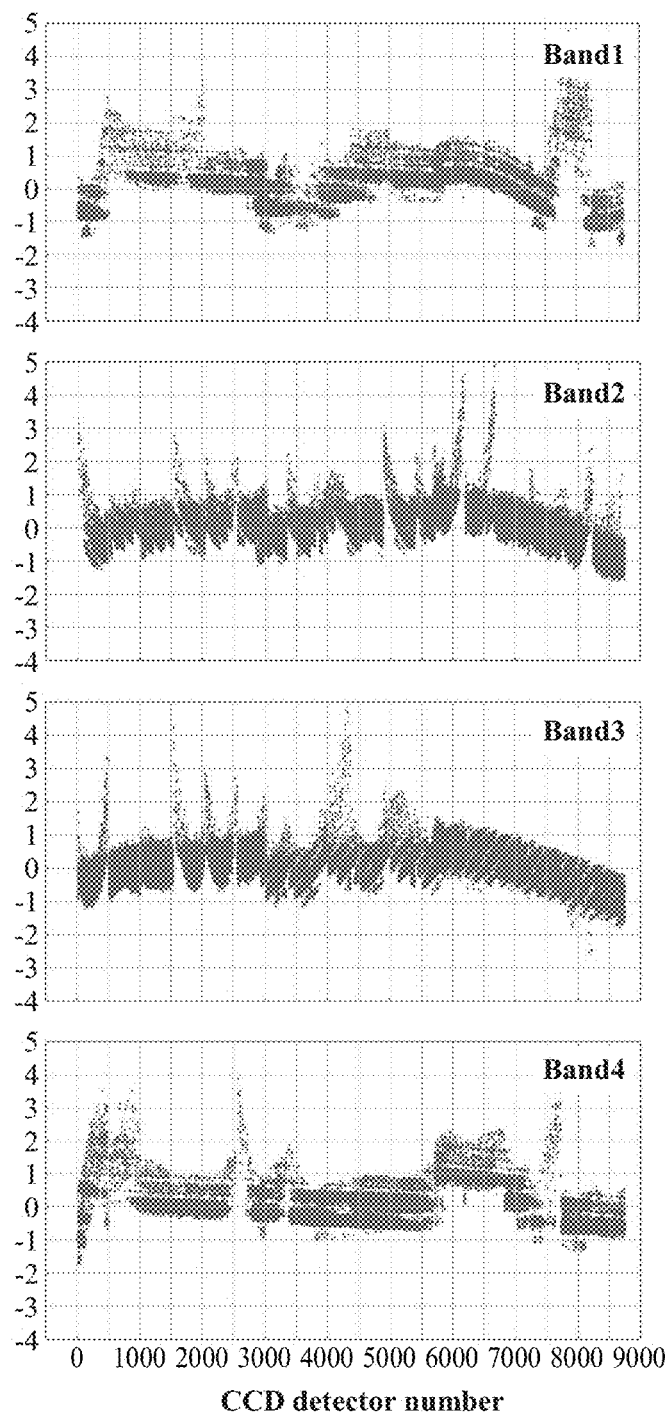
Figure 7C:
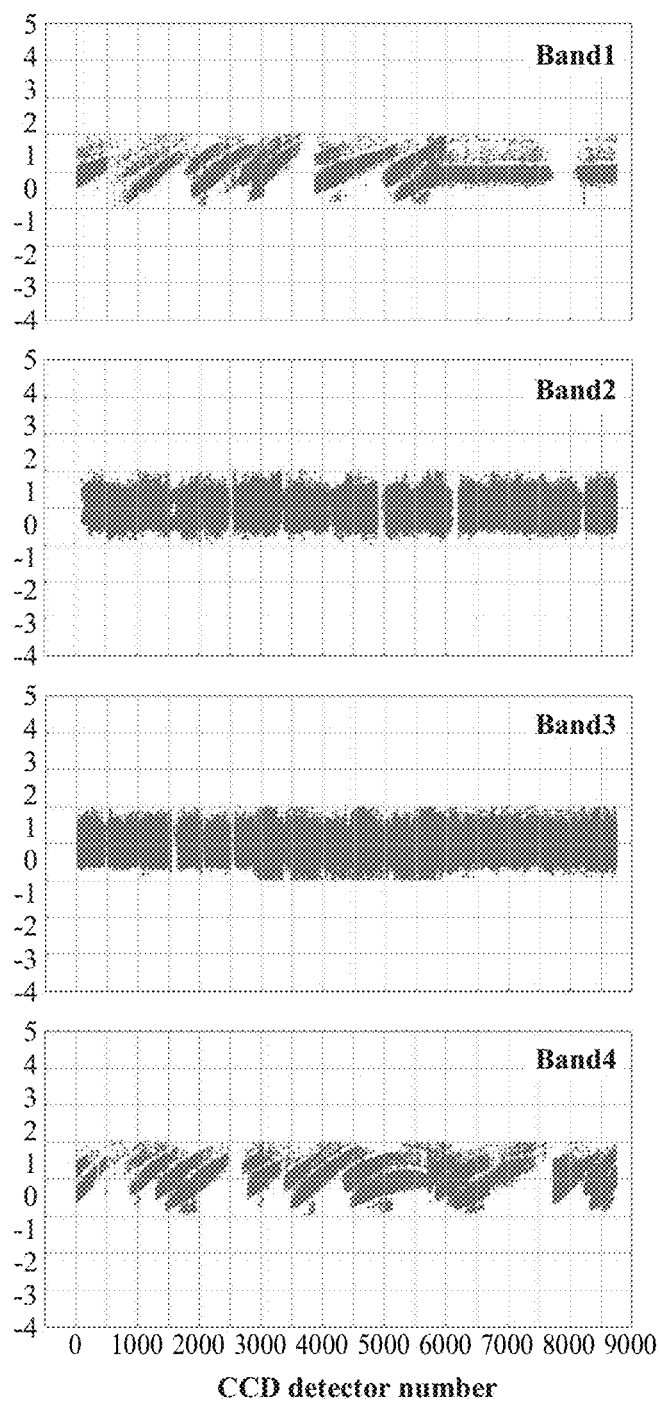
Figure 7D:
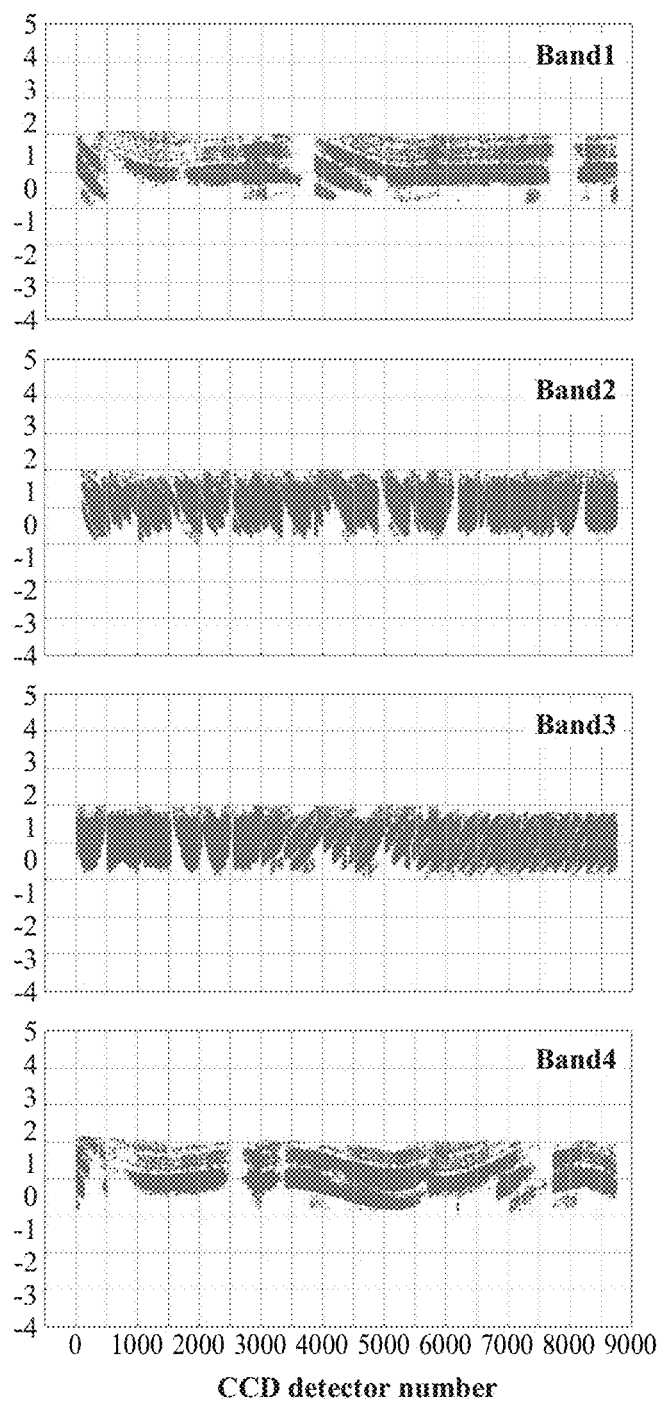

FIG. 6 is the distribution diagram of the matched GCPs from B2 images. Dense GCPs were matched with 1,200 imaging lines between the multispectral and reference DOM and DEM images.

The geo-positioning residuals of the GCPs are the direct reflection of the GC performance. With the estimated GC parameters, a modified RPC for each CCD image was generated using terrain-independent fitting. Therefore, the imaging geo-positioning residuals for all GCPs were calculated using original and modified RPCs.

FIGS. 7A-7D are the distribution diagrams of geo-positioning residual of all CCDs before and after GC. It can be observed that the initial geo-positioning residuals all CCDs were well corrected in both directions, and gross GCPs were eliminated effectively. Each CCD image exhibited almost the same GC accuracy and residual distribution, indicating that this method effectively compensated for geometric distortion from the multispectral camera.

To further illustrate the effectiveness and the accuracy of our method, the geo-positioning residual accuracies of all CCDs were verified and compared. Additionally, considering that the RPM-based GC using dense GCPs is the most accurate and widely used method at present, the comparison between this method and the RPM-based method was also presented. Table 1 lists the root mean square (RMS) accuracies for the geo-positioning residuals. Before GC, the RMS-based accuracies resulted by the camera distortion in the along- and across-CCD directions were as high as approximately 1.5 and 0.5 pixels for all CCDs. After the proposed RPC-based GC, the accuracies were improved to better than 0.3 pixels for all CCDs in both directions. Additionally, for all CCDs, this method and the RPM-based method could obtain almost the same accuracy in correcting the absolute distortion of CCDs, and both reached a high accuracy level better than 0.3 pixels, which directly indicated that proposed GC model and method were reasonable and effective.

TABLE 1

Comparison of the geo-positioning residual accuracies for all CCDs. (x: along the CCD, y: across the CCD)

| Bands | Processing methods and stages | CCD1/pixels | | CCD2/pixels | | CCD3/pixels | |
|---|---|---|---|---|---|---|---|
| | | x | y | x | y | x | y |
| B1 | Before GC | 1.87 | 0.50 | 1.72 | 0.44 | 1.60 | 0.66 |
| | RPC-based GC | 0.25 | 0.25 | 0.26 | 0.21 | 0.14 | 0.22 |
| | RPM-based GC | 0.26 | 0.25 | 0.24 | 0.22 | 0.14 | 0.23 |
| B2 | Before GC | 1.42 | 0.35 | 1.44 | 0.35 | 1.62 | 0.59 |
| | RPC-based GC | 0.29 | 0.28 | 0.28 | 0.28 | 0.29 | 0.28 |
| | RPM-based GC | 0.28 | 0.29 | 0.29 | 0.28 | 0.29 | 0.29 |
| B3 | Before GC | 1.35 | 0.37 | 1.46 | 0.36 | 1.64 | 0.57 |
| | RPC-based GC | 0.29 | 0.29 | 0.30 | 0.28 | 0.29 | 0.29 |
| | RPM-based GC | 0.29 | 0.29 | 0.29 | 0.28 | 0.30 | 0.29 |
| B4 | Before GC | 1.32 | 0.41 | 1.12 | 0.32 | 1.80 | 0.73 |
| | RPC-based GC | 0.30 | 0.20 | 0.27 | 0.28 | 0.29 | 0.23 |
| | RPM-based GC | 0.29 | 0.21 | 0.27 | 0.28 | 0.28 | 0.24 |

In addition to verifying the GC accuracy in correcting absolute distortion, for a multispectral camera with multiple CCDs, it is also necessary to evaluate the method in correcting relative distortion, to ensure that all CCD images can be registered and spliced under a unified EOP framework. To examine this further, the relative geo-positioning accuracy for each CCD relative to the reference CCD was obtained, by calculating the difference between their means of GCP residuals. Table 2 lists the relative geo-positioning accuracies before GC, after RPC-based GC and after the RPM-based GC. Before GC, all CCDs had significant relative geo-positioning residuals, which would have severely affected the geometric splicing and registration of their corresponding multispectral images. After the RPC-based GC, the significant relative positioning residuals in the initial IOPs were obviously eliminated, and the relative distortions in both directions were almost 0 for all CCDs. Additionally, the relative GC accuracies obtained by this method were almost the same as that from the RPM-based method, which could not only compensate for geometric distortion due to each CCD, but also integrate all CCDs under a consistent geometric benchmark.

TABLE 2

Relative geo-positioning accuracies for all CCDs relative to the reference CCD

| Bands | Processing methods and stages | CCD1/pixels | | CCD2/pixels | | CCD3/pixels | |
|---|---|---|---|---|---|---|---|
| | | x | y | x | y | x | y |
| B1 | Before GC | 6.00 | −36.39 | −0.33 | −35.64 | −5.69 | −36.84 |
| | RPC-based GC | −0.01 | −0.02 | 0.01 | −0.02 | 0.03 | −0.03 |
| | RPM-based GC | 0.00 | −0.01 | 0.00 | −0.03 | 0.02 | −0.03 |
| B2 | Before GC | 6.51 | −0.67 | 0.00 | 0.00 | −6.41 | −1.33 |
| | RPC-based GC | −0.01 | 0.00 | 0.00 | 0.00 | 0.02 | −0.01 |
| | RPM-based GC | 0.00 | 0.01 | 0.00 | 0.00 | 0.01 | −0.01 |
| B3 | Before GC | 6.66 | −0.80 | −0.07 | −0.10 | −6.31 | −1.53 |
| | RPC-based GC | −0.01 | 0.00 | 0.00 | 0.00 | 0.01 | −0.01 |
| | RPM-based GC | 0.00 | 0.00 | 0.01 | 0.01 | 0.00 | −0.01 |
| B4 | Before GC | 6.20 | 51.57 | −0.18 | 52.04 | −6.97 | 50.57 |
| | RPC-based GC | 0.00 | −0.01 | 0.00 | −0.01 | 0.00 | 0.00 |
| | RPM-based GC | 0.00 | 0.00 | 0.01 | 0.00 | 0.00 | 0.01 |

Figure 8:
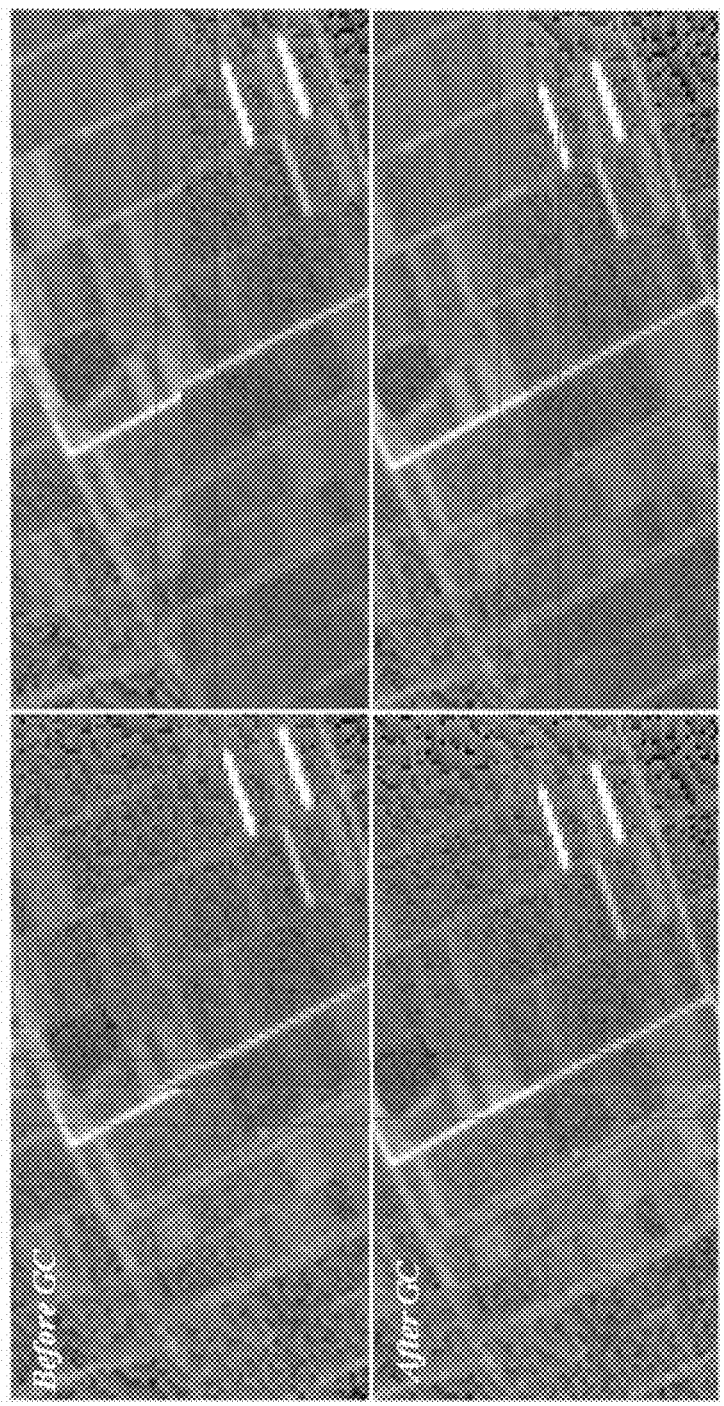
FIG. 8 is the schematic diagram of geometric splicing between adjacent CCD images.

FIG. 8 is the schematic diagram of geometric splicing between adjacent CCD images. Image splicing before and after GC are compared; marked geometric dislocation between adjacent CCD images was corrected. Improvement in geometric splicing was seen in both directions.

Figure 9:
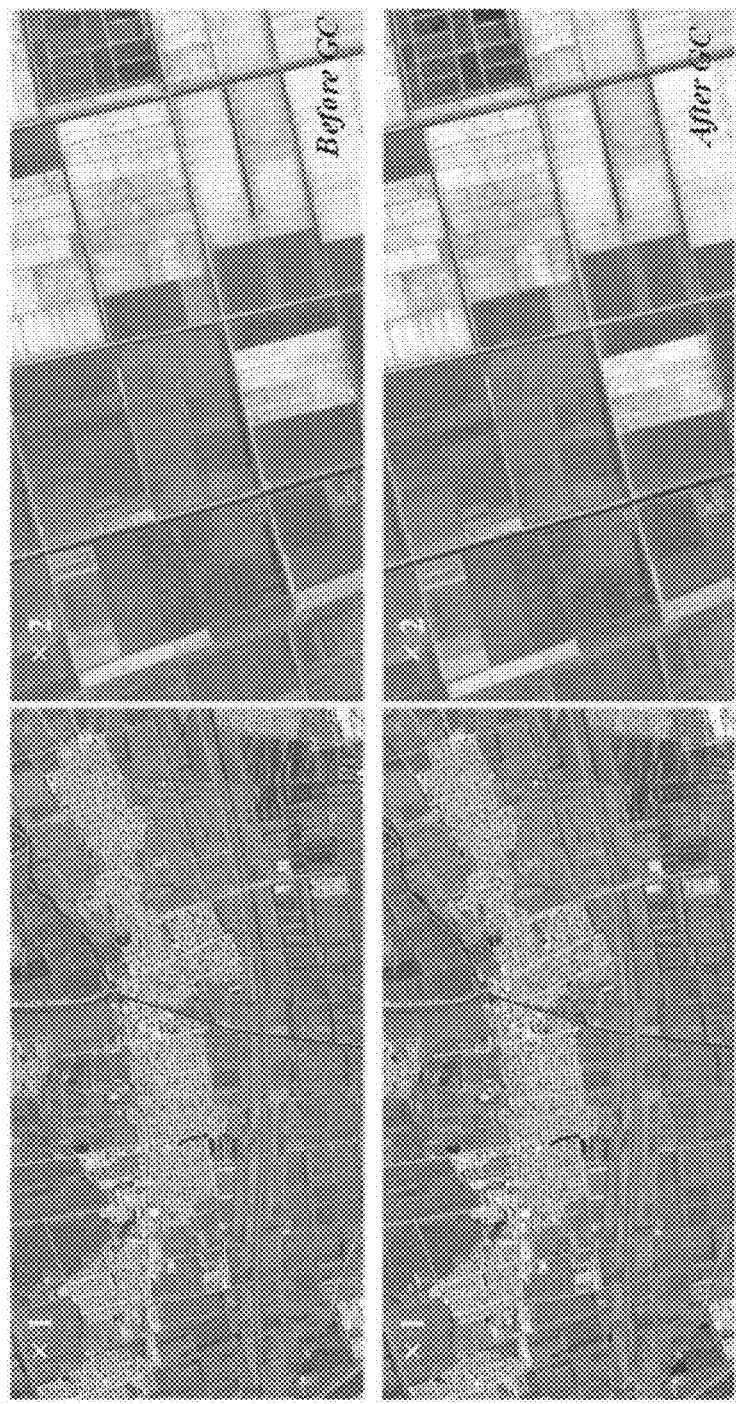
FIG. 9 is the schematic diagram of geometric registration among multispectral images (original image and a section of the image under 2× zoom).

FIG. 9 is the schematic diagram of geometric registration among multispectral images (original image and a section of the image under 2× zoom). Image registration before and after GC are compared; serious light leakage among spectral images was improved.

Overall, the verification results clearly demonstrate the effectiveness of this method, which can achieve the same level of accuracy as the traditional method. However, this method does not require a complex RPM; GC is possible using a standardized RPC model, which represents a substantial advantage over the traditional method.

What is claimed is:

1. A method of on-orbit geometric calibration (GC) for a spaceborne segmented linear-array camera based on a rational polynomial coefficient (RPC) model, the method comprising:

using ground control point (GCP) identified from a reference image of a calibration site as observations, constructing a GC model based on current GC parameters and the RPC, detecting and eliminating gross GCPs using a global model error correction, and achieving an accurate solution through a stepwise absolute and relative GC assisted by angular resolutions for the segmented linear-array camera, wherein the method further comprising:

1) Selecting a satellite remote sensing image for GC, according to an area where the reference image is located, and matching corresponding image points as GCPs;

2) constructing a camera GC model suitable for a geometric processing of optical satellite images using a rigorous physical model (RPM) based on a viewing-angle of charge-coupled device (CCD) detectors, and introducing multiple sets of polynomials to fit viewing-angles of segmented linear-array CCDs, and then determining GC parameters to be solved;

3) Before calculating the GC parameters, according to a correlation between interior orientation parameters (IOPs) and exterior orientation parameters (EOPs), correcting EOP and IOP errors in the RPC by introducing an integrated error correction model of the same order as a viewing-angle model into the RPC, thus reflecting a matching error of the GCPs, which are coupled with the EOP and IOP errors, calculating modified GCP residuals using the error correction model and a threshold defined as three times a root mean square error (3×RMSE) of the residuals, and detecting and eliminating the gross GCPs through an iterative estimation of the error correction model;

4) Based on geometric characteristics of the camera EOPs, constructing an EOP error correction model for RPC with additional translation and rotation transformations, estimating and correcting the EOP errors in the RPC based on the GCPs, and then determining virtual image points that reflects geometric errors of the IOPs;

5) Taking the real and virtual image points of GCPs as observations, taking a condition that the viewing-angles of the virtual and the real image point are equal as constraints, and then on this basis, constructing an adjustment model of the camera GC by introducing angular resolutions;

6) Based on the constructed adjustment model, with assistances of angular resolutions along and across the CCD, performing the absolute GC of each CCD one by one using a stepwise optimization in two directions along and across the CCD, and then compensating absolute geometric distortion of each CCD;

7) Selecting a CCD as the reference, performing the relative GC of non-reference CCDs relative to the reference based on the angular resolutions and EOP corrections, and compensating relative position residuals of each non-reference CCDs relative to the reference CCD; and 8) According to the corrected relative position residuals, based on an imaging inclination angle of the satellite-borne camera along satellite's orbit, constructing a compensation model for bias field-of-view (FOV) distortions, and fusing the compensation of this distortion of each CCD into the calculated viewing-angle model through an overall least squares adjustment, so as to correct the bias FOV distortion along the CCD caused by shifting the non-reference CCD along the orbit.

2. The method of claim 1, wherein the reference image is a digital orthophoto map (DOM) and a digital elevation model (DEM).

3. The method of claim 1, wherein all segmented CCD images match corresponding image points in the same segment along an image line direction as GCP observations.

4. The method of claim 1, wherein 3) comprises:
firstly, based on object coordinates of the GCPs, calculating corresponding image coordinates using the RPCs of the CCD images, and then obtaining imagery positioning residuals between calculated and matched image coordinates;
secondly, using the error correction model of the same order as the viewing-angle model to correct the EOP and IOP errors existing in the imagery positioning residuals;
according to the correlation between EOPs and IOPs, using a least squares adjustment to calculate coefficients of the error correction model together, and then calculating remaining imagery residuals after correcting the EOP and IOP errors, which directly reflects matching errors of the GCPs; and counting a mean value and a root mean square error of all residuals to detect and eliminate the gross GCPs; and
finally, after each detection and elimination, performing above estimating error correction model coefficients, detecting and eliminating gross GCPs again based on remaining GCPs; the gross error elimination is completed until the calculated coefficients in two consecutive iterations change less than the set threshold.

5. The method of claim 1, wherein the angular resolution is determined according to an equivalent relationship between a ratio of angular resolutions and a ratio of ground sample distances in both directions; the ground sample distance ratio is obtained based on the local ground sample distances in the RPC model, and the angular resolution along the CCD is estimated using the calculated GC parameters in this direction.

6. The method of claim 1, wherein the IOPs in both directions of each CCD is solved separately and in order; the IOPs for the along-CCD direction needs to be solved first; then, the angular resolution is determined according to calculated GC parameters for this direction, such that angular resolution for another direction can be obtained; GC parameters for the across-CCD direction are solved using the same least squares adjustment method as for the along-CCD direction.

7. The method of claim 1, wherein a CCD is selected as the reference CCD, and the relative position distortions among the CCDs are corrected by modifying constant items in IOP for each non-reference CCD relative to the reference CCD.

8. The method of claim 1, wherein the overall least squares adjustment is performed for each non-reference CCD to fuse the FOV distortion correction into final accurate GC parameters; therefore, the distortions caused by created basis FOV are optimized, and an accurate splicing and registration of all CCD images under a unified EOP benchmark can be realized.

9. A GC system for a spaceborne segmented linear-array camera based on an RPC model executing the method of claim 1, the system comprising: a processor, a memory, and a readable storage medium.

10. The GC system of claim 9, wherein the memory stores program instructions; when the processor executes the instructions in the memory, the system performs the GC method of spaceborne segmented linear-array camera based on an RPC.

11. The GC system of claim 9, wherein the readable storage medium stores a computer program, and when the computer program is executed, the GC method of spaceborne segmented linear-array camera based on an RPC model is realized.

* * * * *